(12) United States Patent
Richter et al.

(10) Patent No.: US 7,859,394 B1
(45) Date of Patent: Dec. 28, 2010

(54) SHIFT LIGHT SYSTEM AND METHOD

(75) Inventors: Matthew Richter, Woodside, CA (US); Guenter Sifnatsch, Waldkirch (DE)

(73) Assignee: FES LLC, Woodside, CA (US)

( * ) Notice: Subject to any disclaimer, the term of this patent is extended or adjusted under 35 U.S.C. 154(b) by 119 days.

(21) Appl. No.: 12/018,759

(22) Filed: Jan. 23, 2008

(51) Int. Cl.
*B60Q 1/00* (2006.01)
(52) U.S. Cl. .................... 340/456; 340/439; 340/815.65
(58) Field of Classification Search ................. 340/456, 340/439, 815.65; 701/64; 434/29, 62, 71
See application file for complete search history.

(56) References Cited

U.S. PATENT DOCUMENTS

| | | | | |
|---|---|---|---|---|
| 5,406,861 | A | * | 4/1995 | Steeby ...................... 74/336 R |
| 6,789,928 | B2 | * | 9/2004 | Khan .......................... 340/441 |
| 6,803,530 | B2 | * | 10/2004 | Carlstrom et al. ........... 177/136 |
| 6,973,377 | B2 | | 12/2005 | Majstorovic et al. |
| 7,013,207 | B2 | | 3/2006 | Majstorovic et al. |
| 7,379,801 | B2 | * | 5/2008 | Heffington .................. 340/438 |

OTHER PUBLICATIONS

Nology Online Catalog, Sequential Shift Light (dated Jan. 23, 2008) (3 pgs.) http://www.nology.com/shiftlight.html.
PLX Devices (dated Jan. 23, 2008) (6 pgs.) http://www.plxdevices.com/products/r500/.
Nology Online Catalog, The Nology G-Dyno™ Series Automotive Performance Computers Acquisition System with Accelerometer and GPS (dated Jan. 23, 2008) (3 pgs.) http://www.nology.com/gdynom.html.
G2X Serious About Racing:? (dated Jan. 23, 2008) (2 pgs.) http://www.g2xtreme.com/main.htm.
MC33800 Product Summary Page (dated Jan. 23, 2008) (1 pg.) http://www.freescale.com/webapp/sps/site/prod_summary.jsp?code=MC33800&nodeId=01435979968460.

* cited by examiner

*Primary Examiner*—Thomas J Mullen
(74) *Attorney, Agent, or Firm*—DLA Piper LLP (US)

(57) ABSTRACT

A shift light system and method are described. The shift light system has an RGB illumination device that has configurable illumination states with one or more illumination states coupled to a processing unit wherein the one or more illumination states having one of a different color and a different color sequence that correspond to one or more states of the vehicle as indicated by the at least two vehicle generated signals.

8 Claims, 5 Drawing Sheets

SHIFT LIGHT SYSTEM AND METHOD

FIELD

A system and method for displaying an indication of a pending shifting event in a vehicle are described.

BACKGROUND

Devices and systems exist that allow a shift point for a vehicle to be identified based upon the revolutions per minute (RPM) of the engine of the vehicle. The conventional devices and systems also have an input for vehicle speed in order to support gear dependent shift points. However, these features are typically available in an expensive and complex full race computer which is not a small compact unit. There are also conventional systems that provide a dumb light to indicate a shift point, but these systems require the dumb light to be plugged into another unit that computes the RPMs of the vehicle which means that these systems are not self-contained and require some connection to an existing unit.

DETAILED DESCRIPTION OF ONE OR MORE EMBODIMENTS

The shift light system and method are particularly applicable to a hardware implemented car shift light system and it is in this context that the system and method will be described. It will be appreciated, however, that the system and method has greater utility since it may be implemented in software or programmable hardware logic in addition to the hardware implementation described below and it may be used for various different vehicles including land-based vehicles, water-based vehicles and the like.

Figure 1:
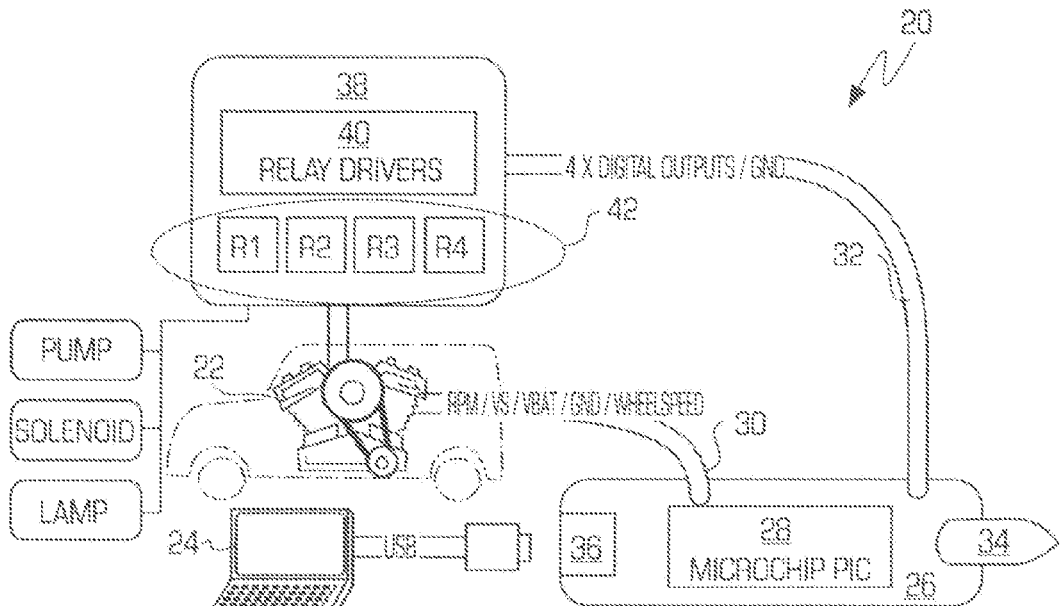
FIG. 1 illustrates a first embodiment and a second embodiment of a shift light system.

FIG. 1 illustrates a first embodiment and a second embodiment of a shift light system 20. The system may be coupled to a vehicle 22 and a computing device 24 as shown. The system 20 may further comprise a shift light unit 26 that incorporates a processing unit 28, one or more input signal lines 30 that are fed into the processing unit, one or more output signal lines 32 that output signals generated by the processing unit, an illumination device 34 controlled by the processing unit and an interface port 36 that allows for one-way or two-way communication between the computing device and the processing unit. In one embodiment, the processing unit may be the commercially available Microchip® PIC microcontroller unit (MCU), such as the commercially available Microchip® PIC18F2455 chip. The shift light system 20 may further include one or more analog to digital (A/D) or digital to analog (D/A) converters (not shown) that convert the input signals from analog to digital as needed and/or convert the output signals from analog to digital as needed. In another embodiment described below in more detail, the shift light system may further include a relay module 38 that has one or more relay drivers 40 and one or more relays 42 (such as relays R1, R2, R3 and R4 as shown in FIG. 1) that may be coupled to the vehicle 22.

In the embodiments shown in FIG. 1, the illumination device may be a RGB light emitting diode (LED), although the shift light system may use other known or yet to be developed illumination devices that provide one or more different colors when illuminated. In the embodiment using the RGB LED, the shift light system may allow the user to select the particular color of the light emitted from the RGB LED wherein the color may be selected by the user at the computing device 24 which is then communicated to the processing unit 28 through the interface port 36. The processing unit may then generate the control signals to cause the RGB LED to illuminate with the user selected color. Alternatively, the control of the color of the LED can be done by direct inputs via buttons or dials pressed by a user or via wireless control.

The illumination device 34 with different colors (or the use of more than one illumination devices) may provide different LED user cases so that the shift light system may provide the user with different feedback. For example, the shift light system may provide an RPM shift point, but may also provide other feedback. For example, in the programming mode, a slow pulsing color may indicate the programming mode while a different color or pulse rate could be used to indicate what field was being set and some flash or third color could be used to show that the value was properly stored or if the setting failed.

In one embodiment, the one or more input signal lines 30 may include a revolutions per minute (RPM) signal from the vehicle 22 (that may be generated from a Vs or Vbat signal in combination with a ground signal in one embodiment) as well as a wheel speed signal that allows the shift light system to support gear dependent shift points. The wheel speed signal may be generated in a number of different manners, such as a speed pick up from the vehicle, from an accelerometer input to the processing unit (in which acceleration is integrated to get velocity and then velocity divided by RPM results in miles per revolution that is an indication of gear ratio), or from a global positioning system (GPS) input to the processing unit (in which rate of change of position results in velocity and then velocity divided by RPM results in miles per revolution that is an indication of gear ratio).

In one embodiment, the one or more output signal lines 32 may be one or more digital outputs (such as four digital outputs as shown along with a ground signal) although the shift light system is not limited to any particular number of output signal lines. Each state of the output signal lines may be user configurable so that the output signals can be a function of whether or not the engine is running, the RPM signal, the speed signal or a combination of these signals.

In one embodiment, the shift light system 20 may also permit the output signal lines 32 to be configured via software to be a mixture of inputs and outputs. The shift light system may then be used to, for example, read something like the output of a temperature sensor and use the shift light to issue a warning to the driver (say, for example, that some shade of blue or purple was chosen to be the color used to indicate it's time to shift gears, then red or yellow could be used to indicate a temperature warning.)

In one embodiment, the interface port 36 permits the processing unit 28 (and the shift light system 20) to be configured using a separate application such as a piece of software on the computing device 24 in one embodiment. The configuration may include, for example, setting up the color of the RGB LED, setting up the shift points and setting up digital output trip points (on shift light systems equipped with digital outputs as described below in more detail. In one embodiment, the interface port 36 may be a universal serial bus (USB) port, but the shift light system 20 also may use any other interface protocol, such as CAN, Ethernet, RS-232 etc as the shift light system can be implemented using various different interface port protocols. The configuration may also be done using a web-based application or a stand alone application, such that the user could input a torque curve as determined from a dynamometer or performance meter so that, by the configuration application, optimal shift points would then be calculated based on torque curve, gear ratios, and if available, something called the "effective mass" of the car that takes into account rotating assemblies' moments of inertia.

The shift light system 20 may be power sensitive so that, when the vehicle is not running (as indicated based on the input signals), any higher current demands can be turned off when the vehicle is not running. This allows the shift light system to be plugged into an always hot lead without draining the battery of the vehicle.

The shift light system may also have programming interface awareness so that the shift light system can determine when the shift light system is plugged into a communications interface, such as a USB connector in one embodiment. For example, the system can determine that the shift light system is plugged in based on the presence of a power feed on the connector (USB has a +5 volt, a ground line, and two signal lines, for example), based on message traffic on the line (Ethernet doesn't always have power, but one could look at the lines and see if there were signals present) or based on physical movement of a switch when some connectors have switches that are physically moved. In one embodiment, the system uses commands and the programming interface can switch the shift light system into a configuration mode and back into normal operation and a third state would be 'monitor' which is similar to normal operation but data will be written to the programming interface (debugging, data logging, analysis).

Thus, the shift light system can automatically support two modes of operation, such as "programming" (when the connection is detected) and "use". In one embodiment, the shift light system may be turned on remotely via the programming interface so that a user can check car states, digital outputs and the like without the engine running to provide, for example, functional tests when the engine is not running, and the unit's outputs would normally be in a low current state.

The shift light system 20 may also include wireless data support (such as wireless hardware not shown in FIG. 1) that allows the shift light system to receive a large amount of car state data so that complex control processes (such as those being executed by the processing unit 28) can be used to generate the digital outputs and LED displays.

In the second embodiment of the shift light system that has the relay module 38 with one or more relay drivers 40 and one or more relays 42 (such as relays R1, R2, R3 and R4 as shown in FIG. 1), the relay module 38 may be used to control larger current loads than the 25 milliamps that the processing unit 28 can support. The relay module 38 may be used to control/power small pumps, solenoids, motors, lamps or the like within the vehicle.

Figure 2:
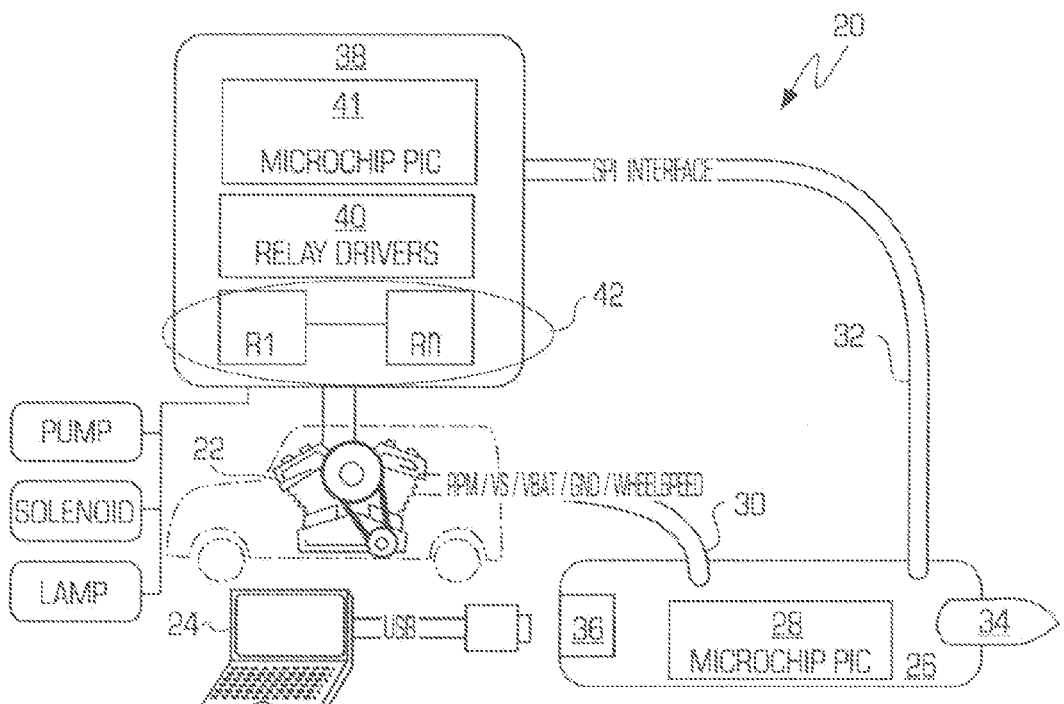
FIG. 2 illustrates a third embodiment of a shift light system.

FIG. 2 illustrates a second embodiment of a shift light system 20. Elements with the same reference number as those elements shown in FIG. 1 have the same function and will not be described further with reference to FIG. 2. In the embodiment shown in FIG. 2, the one or more output signal lines 32 may be a bi-directional serial communications bus that would allow the customer to reconfigure the shift light system. In one implementation of the shift light system, the serial bus may be a serial peripheral interface (SPI) bus that is coupled to the relay module 38 that further comprises a processing unit 41, such as a Microchip® PIC MCU, that allows a two-way communication path between the relay module and the shift light system.

For example, this embodiment may send the values of RPM and Speed to the MCU equipped relay module where the logic can reside and the MCU can then evaluate the logic in order to turn the relays on and off which would require that the shift light have downloaded the logic at set-up or power up initialization. Alternatively, in this embodiment, the MCU can watch fault detection circuitry and report opens, shorts or relay failure information to the Shift Light MCU. Alternatively, in this embodiment, the MCU in the relay module could receive an output state "word" that contains the information about the outputs and it could decode the word to set the relay states as required. Alternatively, in this embodiment, the MCU could receive address and state information and by using techniques like this multiple relay modules could be used, each one only responding to state information that is properly addressed.

The shift light system is not limited to the SPI bus and other suitable interfaces may include a TWI interface, a universal aynchronous receive/transmit (UART) interface, an inter-IC (I2C) interface, an RS485 interface, a controller area network (CAN) interface or a USB interface. Some of these are real communication busses, some are point-to-point only. Using a multi-drop protocol would mean that shift light system could support an arbitrary number of "slave" modules, limited only by the specifications of the protocol. Point-to-point would be limited to only one slave unit.

The embodiment shown in FIG. 2 with the networked relay module and the shift light system has a number of advantages. For example, the embodiment provides increased noise immunity due to no long output lines from the shift light system. The embodiment may also provide increased number and complexity of the outputs driven (the slave chip in the relay module 38 has the ability to drive higher current loads, and also has some connectivity diagnostics, like the ability to detect shorts and opens in the controlled item). The embodiment also allows bi-directional traffic so that the slave chip can measure things other than the RPM and Speed, and send that information up to the shift light system.

Figure 3:
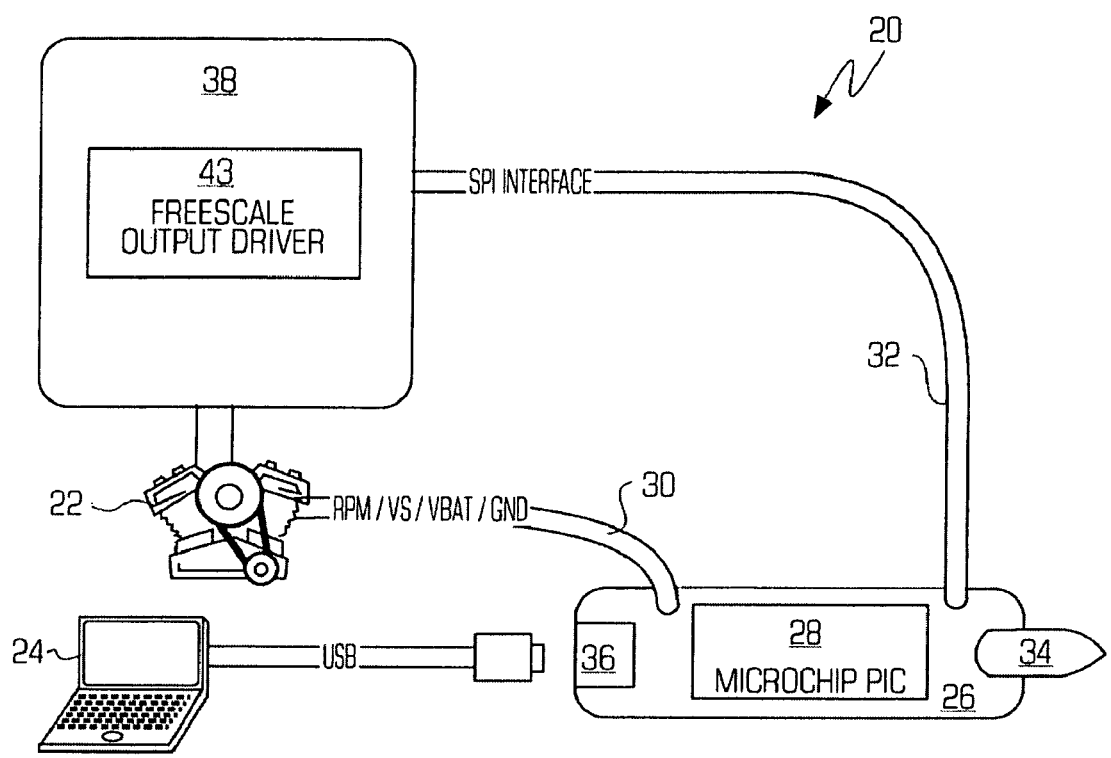
FIG. 3 illustrates a fourth embodiment of a shift light system.

FIG. 3 illustrates a third embodiment of a shift light system 20. Elements with the same reference number as those elements shown in FIG. 1 have the same function and will not be described further with reference to FIG. 3. In the embodiment shown in FIG. 3, the one or more output signals 32 may be the bi-directional serial communications bus as described above and may further include an output driver chip 43 in the relay module 38. The output driver chip may be a commercially available Freescale chip, such as the Freescale MC33800 whose details are described in further detail at: http://www-.freescale.com/webapp/sps/site/
prod_summary.jsp?code=MC33800&nodeId=014359
79968460, that is an automotive integrated circuit that has device drivers (for higher current device operation) as well as diagnostics (it can detect shorts or opens on the attached devices to aid in automatic diagnostic functions). As with the embodiment shown in FIG. 2, the output driver chip can be used to measure other items, and communicate with the master controller housed in the shift light system unit 26.

Figure 4:
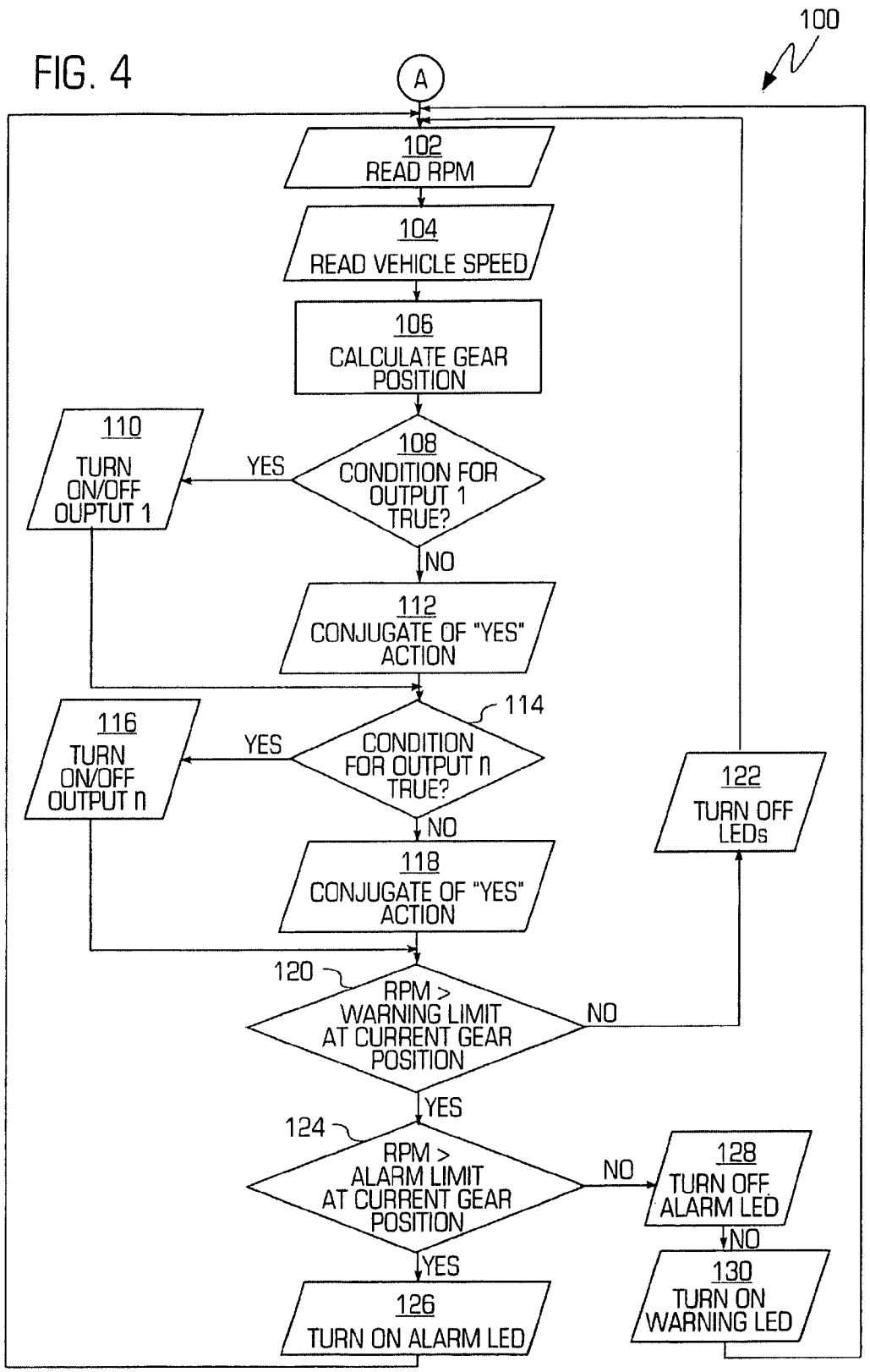
FIG. 4 illustrates a method for shift point display using the shift light system.

FIG. 4 illustrates a method 100 for shift point display using the shift light system. The method in one embodiment may be carried out by the shift light unit 26 and in particular by a plurality of lines of computer code being executed by the processing unit 28 of the shift light unit 26. In the method, the RPM signal from the engine is read (102), the vehicle speed is read/determined (104) and gear position of the vehicle engine is calculated (106). The method then tests to determine if the condition to trigger output 1 is true (108) and turns output 1 on/off if the condition is met (110) or performs the opposite action if the condition is not true (112). As described above, the outputs of the shift light system are configurable so that the actual output signal corresponding to output 1 is configurable and the output conditions are also configurable.

Once the conditions for output 1 are tested, the shift light unit tests to determine if the conditions for one or more other outputs (such as output N) are true (114) and turns output N on/off if the condition is met (116) or performs the opposite action if the condition is not true (118). The shift light unit then determines if the RPM value is greater than a configurable warning limit at the current gear position (120) and turns the illumination elements OFF is the RPMs are not above the warning limit (122) and then re-reads the RPM signal (102). If the current RPMs of the engine exceed the limit, then the shift light unit determines if the current RPMs exceed a configurable alarm limit at the current gear position (124). If the current RPMs does not exceed the alarm limit, then the alarm LED state is turned off (128), the warning LED state is turned ON (130) and the RPMs of the engine is re-read (102). If the current RPMs exceed the alarm limit, then the alarm LED state is turned ON (126) and the RPMs of the engine is re-read (102).

In an alternative method, the shift light system can trip an alarm or a state change when there are more than one test to turn the light on or off. For example, the shift light system may trigger an alarm when a particular value is about a value, X, and if the off criteria is also at the value X, then a "flicker" of the light or a rapidly changing output state may result which is problematic when a high startup current device like a motor or solenoid is being started or could make a warning light (like over temp or pressure) flicker. In the context of a temperature value, the shift light system may turn on a warning when the coolant is above 100 C and off at 98 C which would eliminate any flicker that noise or a value hovering right at the transition value would create.

Figure 5:
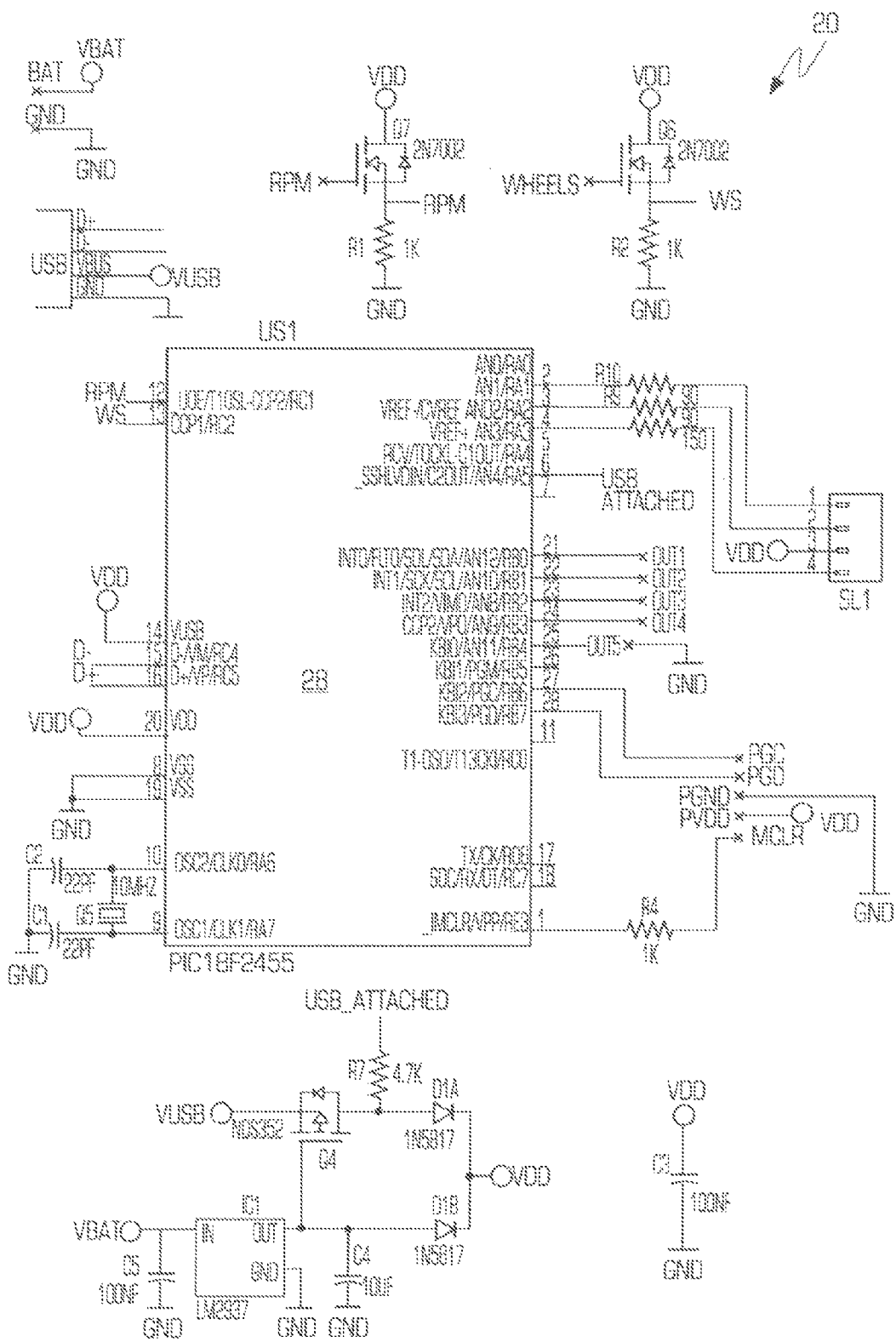
FIG. 5 illustrates an example of a hardware implementation of the shift light system.

FIG. 5 illustrates an example of a hardware implementation of the shift light system 20. In the illustrated hardware implementation, the Microchip PIC18F2455 chip is the processing unit 28. The Microchip PIC18F2455 chip operates as described in the datasheet for the Microchip PIC18F2455 chip which is incorporated herein by reference. As shown, the VUSB and VBAT signals are coupled to the VUSB and VDD inputs of the chip. The VBAT signal is fed through a low dropout regulator, such as the National LM2937 shown in FIG. 5. The RPM and wheel speed input signals are fed through N-channel enhancement mode field effect transistors (FETs), such as ones packaged in a Fairchild 2N7002 chip as shown in FIG. 5, and into the processing unit 28 as shown. The processing unit 28 has the outputs (such as OUT1, OUT2, OUT3 and OUT4) as shown in FIG. 5, that are output signals of the shift light system.

Figure 6:
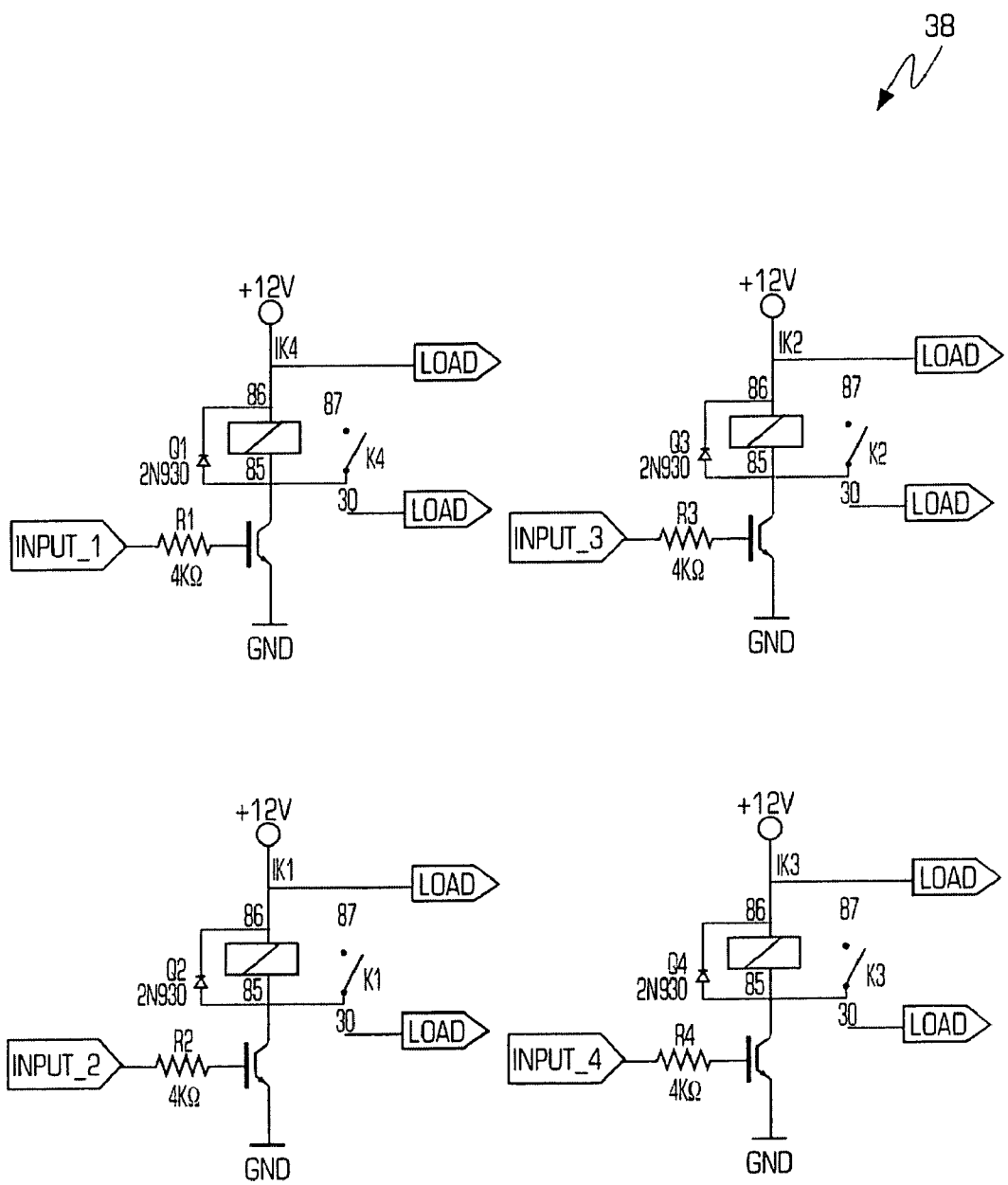
FIG. 6 illustrates an example of an implementation of the relay module of the shift light system.

FIG. 6 illustrates an example of an implementation of the relay module of the shift light system. As shown, the relay module may include a field effect transistor to drive each of the relays.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A shift light unit, comprising:
   a processing unit coupled to at least two vehicle generated signals, the at least two vehicle generated signals including a revolution per minute signal and a wheel speed signal;
   an interface, coupled to the processing unit, that provides configuration signals to the processing unit;
   the processing unit having one or more output signals wherein each output signal is configured based on the configuration signals and is generated in response to a condition of a vehicle as indicated by the at least two vehicle generated signals; and
   a red-green-blue (RGB) illumination device that has configurable illumination states comprised of one or more illumination states coupled to the processing unit, the one or more illumination states each having a different color that correspond to one or more states of the vehicle as indicated by the at least two vehicle generated signals.

2. The shift light unit of claim 1, wherein the RGB illumination device further comprises an RGB light emitting diode.

3. The shift light unit of claim 1 further comprising a relay module coupled to the vehicle wherein the one or more output signals control the relay module to change the operation of a portion of a vehicle.

4. The shift light unit of claim 3, wherein the portion of the vehicle further comprises a pump, a solenoid, a motor or a lamp.

5. The shift light unit of claim 3, wherein the relay module further comprises a relay driver module and one or more relays controlled by the relay driver module.

6. The shift light unit of claim 5, wherein the relay module further comprises a processing unit.

7. A shift light method, comprising:
   receiving, at a processing unit of a shift light unit, at least two vehicle generated signals, the at least two vehicle generated signals including a revolution per minute signal and a wheel speed signal;
   configuring, based on configuration signals received at an interface, the processing unit of the shift light unit;
   outputting, in response to a condition of a vehicle as indicated by the at least two vehicle generated signals, one or more output signals wherein the one or more output signals are configured based on the configuration signals; and
   generating, using a red-green-blue (RGB) illumination device of the shift light unit, one or more illumination states, the one or more illumination states each having a different color that correspond to one or more states of the vehicle as indicated by the at least two vehicle generated signals.

8. The shift light method of claim 7 further comprising controlling, using the one or more output signals, a relay module to change the operation of a portion of a vehicle.

\* \* \* \* \*